United States Patent [19]
Åberg

[11] 3,967,408
[45] July 6, 1976

[54] ANIMAL TRAP

[76] Inventor: Jan Åberg, Pl. 3, Fallbacken, Skelleftea, Sweden, S-931 00

[22] Filed: Apr. 17, 1975

[21] Appl. No.: 568,925

[30] Foreign Application Priority Data
Apr. 25, 1974  Sweden .............................. 7405565

[52] U.S. Cl. ................................................ 43/87
[51] Int. Cl.² ........................................ A01M 23/34
[58] Field of Search .............. 43/87, 15, 34, 35, 36, 43/42.04

[56] References Cited
UNITED STATES PATENTS
3,060,615  10/1962  Spets ...................................... 43/15
3,068,608  12/1962  Counts ................................... 43/87
3,557,486  1/1971  Wright ............................. 43/44.95
3,816,953  6/1974  Hameen-Anttila ...................... 43/35

Primary Examiner—Warner H. Camp
Attorney, Agent, or Firm—Darby & Darby

[57] ABSTRACT

An animal trap comprising a tubular body with a protective material casing having a spring located in the body which is attached to a snare located outside of the body. The contraction of the spring is controlled by a trap setting mechanism including a release arm and the spring is released to contract and move the snare towards the body when the animal treads on the release arm.

11 Claims, 6 Drawing Figures

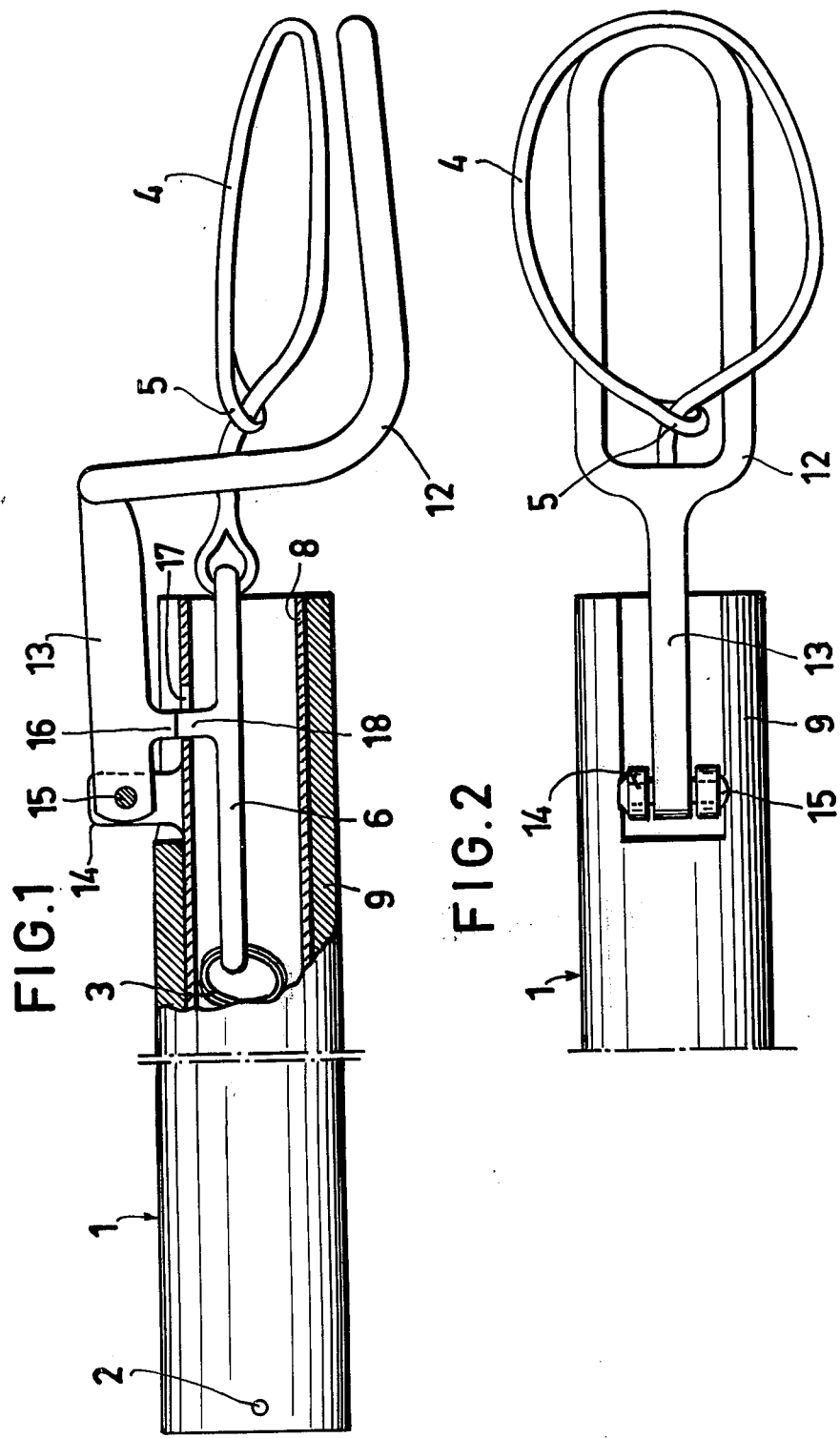

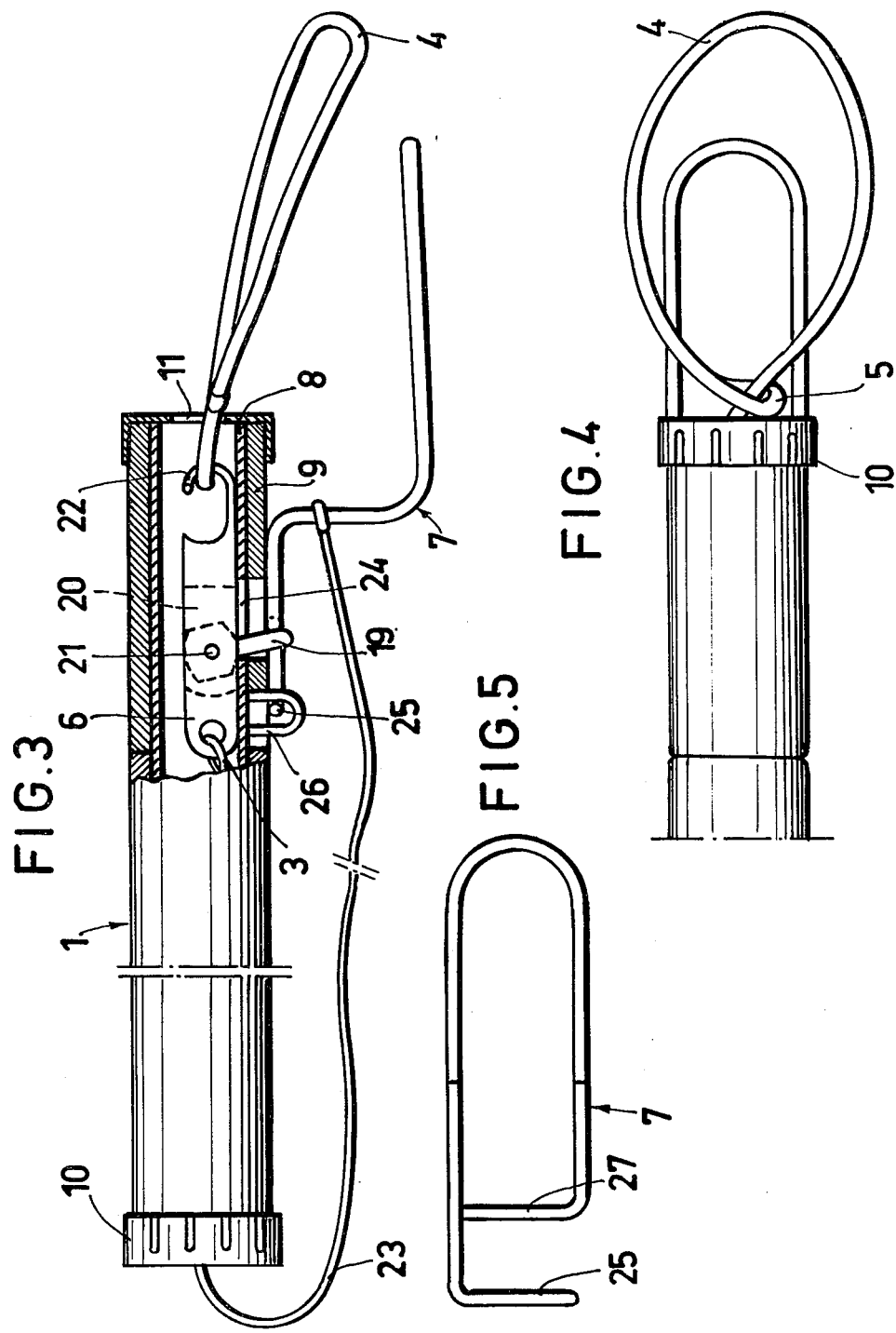

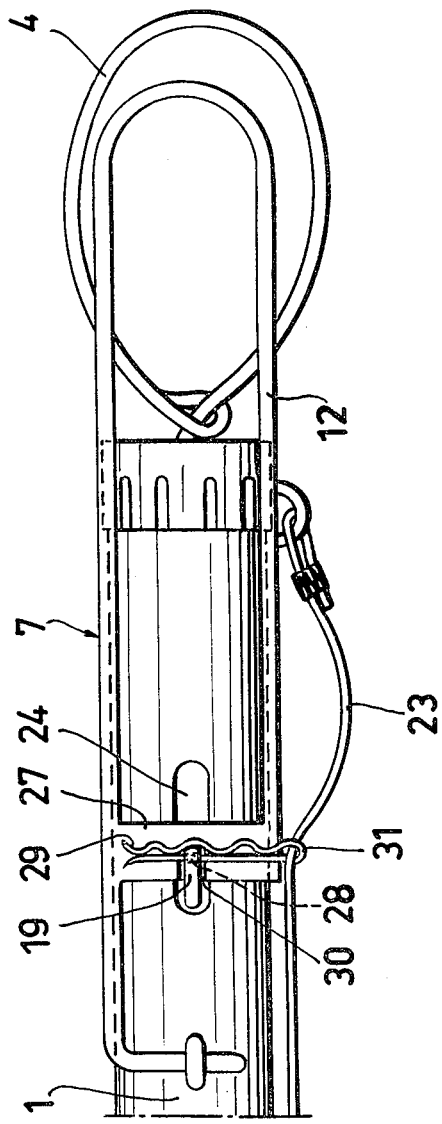

ANIMAL TRAP

This invention relates to a trap intended to be laid in runways of predatory animals, for example foxes, preferably in wintertime, and comprising a tubular body member, a helical spring secured therein and a snare connected to the spring which upon release of the spring rapidly is tightened about the animal's leg by action of said spring.

As traps for foxes and like animals mostly so-called animal pincers have been used, because these pincers, which are provided with jaws, have proved very reliable. These pincer traps, however, have the disadvantage of in many cases hurting a trapped animal and subjecting it to great pain. For this reason, the application of such pincer traps, for example for foxes, is entirely prohibited in some countries, and a similar prohibition can be expected also in further countries.

As, with the exception of cages and similar devices, no trap exists which can be used instead of said pincer traps. The present invention has the object of providing a trap of the aforesaid kind which is very considerate for the trapped animal and does not cause any pain, and which is as reliable as the aforesaid pincer trap. Another object of the invention is to produce such a trap, which is provided with a snare, and which need not be secured to a tree or the like, but can be laid directly in the snow so that the snare lies hidden about an animal runway and the releasing mechanism for the snare lies beneath the runway proper, and which, after e.g. a fox has been entrapped, acts as a drag-anchor or trail-brake, which efficiently hinders the fox from moving very far from the place where the trap was laid. These objects are achieved thereby and the trap according to the invention has the characterizing features defined in the claims.

The invention is described in greater detail in the following, with reference to the accompanying drawings, in which FIG. 1 is a side view of a first embodiment of the trap according to the invention in set state and shown partly in section, FIG. 2 is a top view of the forward end portion of the trap in FIG. 1, FIG. 3 is a side view of a second embodiment of the trap according to the invention in set state and shown partly in section, FIG. 4 is a top view of the forward end portion of the trap in FIG. 3, FIG. 5 is a top view of the tread release mechanism or release arm for the embodiment shown in FIGS. 3 and 4, and FIG. 6 is a bottom view of a modified embodiment of the release arm of the trap shown in FIGS. 3–5 in a position set and put on safety.

The trap according to the invention which is intended especially for being laid in animal runways during wintertime, but, of course, can also be used during other seasons, comprises in the embodiments shown in the drawings a tubular body member 1, a helical and relatively strong spring, preferably of stainless steel, secured on the rear end of said body member by means of a split pin 2, preferably a tube split pin. Only the end of the spring indicated at 3 is shown. A snare 4 with a loop 5, preferably consisting of a plaited nylon rope with or without a core, for example in the form of a wire is provided and or a plastic-coated wire. A setting mechanism 6 connects the snare 4 with the spring 3, and a release arm or so-called tread release 7.

The tubular body member 1, which may have a length of one meter, comprises a steel tube 8 and a relatively thick protective casing 9 enclosing the entire steel tube 8 with a force fit. The casing 9 consists of a rubber or plastic or some other suitable material, into which the entrapped animal can bite without damaging its teeth, and which further must be so resistant to such damage that it prevents an entrapped animal at least for some days from getting its teeth into direct contact with the steel tube 8. In order to additionally increase the protection, the body member 1 may, as shown in FIG. 3, be provided at both ends with an end cap 10 of rubber or plastic, and the cap at the end with the setting mechanism has an aperture 11 for the snare 4 with a diameter preferably smaller than the inner diameter of the tube.

The release mechanism 7 in the embodiment according to FIGS. 1 and 2 comprises an angular tread portion 12 and in connection therewith a lever 13, which is pivotally supported at 15 between two lugs 14 fastened on the tube 8 by means of a rivet, screw, tube split pin or the like. The release arm 7 is provided at the lever 13 with a projection 16, which in set state of the trap rests against a catch 18 inserted into a hole 17 in the tube 8 and located on the setting mechanism 6 proper. Catch 18 is retained in the hole 17 in abutment to one edge thereof by action of the spring 3, which in set position of the trap is under strong tension. When a fox, for example, treads on the hidden tread portion 12 of the release arm, the setting mechanism 6 is released thereby and its catch 18 is pressed out of the hole 17 by the projection 16 of the lever 13, and thereby the spring 3 as well as the snare 4 connected therewith are released. The snare, upon the return movement of the spring, is pulled into the body member 1 with one of its strands and simultaneously is tightened about the leg of the animal having caused the release. The animal thereby is caught, but has the possibility of moving the snared leg to some extent owing to the spring, which in this position is tensioned only slightly or not at all.

In the embodiment shown in FIGS. 3–5 the setting mechanism 6 is provided with a catch 19, which is pivotally supported in a recess 20 in said setting mechanism 6. Catch 19 pivots about an axle 21 and setting mechanism 6 has a hook 22 for holding the snare 4. Said hook is branched at its free end so as to prevent unintentional loosening of the snare. This embodiment further differs from the aforedescribed embodiment in that the release mechanism 7 has a design different from that shown in FIGS. 1 and 2. The release mechanism is not rigidly connected to the body member 1, but instead is connected loosely by means of a plastic-coated wire 23 fastened at the rear end portion of the body member, for example on the same split pin 2 as the spring. In the set state of the trap wire 23 lies loosely at the lower surface of the body member, as shown especially in FIG. 3, in which position it is retained by the catch 19 of the setting mechanism 6 and a lug 26 fastened at the tube, into which lug a portion 25 of the release arm is inserted. In this embodiment, furthermore, the forward portion of the protective casing 9, which due its position close to the trapped animal will be especially subjected to damage, is a separately exchangeable part, as indicated in FIG. 4 by a continuous line.

When setting the embodiment of the trap according to the invention shown in FIGS. 3–5, the spring 3 is tensioned by pulling the snare 4 out of the body member, as in the aforedescribed embodiment, whereby also the setting mechanism 6 follows along, and the catch 19 of the mechanism pivots into a hole 24 both in the tube 8 and in the protective casing 9, which takes place fully automatically provided that the body member is held inclined, with the hole facing downwards. Thereafter the release arm 7 is attached by inserting its portion 25 in FIG. 5 into the lug 26 fastened on the tube 8 and at the same time placing a portion 27 in parallel with said portion of the release arm in front of the catch 19 pivoted out of the hole 24 in the body member. The catch 19 is locked against the hole edge and the portion 27 of the release arm which in this position is fixed by engagement of the release arm portion 25 with the lug 26. The trap is now set and ready to be laid, for example in an animal runway in the snow, in such a manner, that the release arm portion lying beneath the snare is hidden below the runway proper in the snow, and the snare also lies hidden about the runway proper. When, for example, a fox treads on the release arm 7, the arm is pivoted away from the body member, i.e. downwards in FIG. 3, whereby the catch 19 and, consequently, the spring 3 are released, which latter rapidly tightens the snare about the animal's leg. As the release arm 7 only is hooked in the lug 26, it will without fail after its release loosen from the body member and thereby act as a trailbrake or drag-anchor, if the trapped animal should try to move away with the trap, and due to the hook-shaped portion 25 of the release arm it will readily get stuck in the shrubbery and other vegetation and thereby additionally obstruct the animal's escape. This arrangement of the release arm or tread release mechanism 7 in such a manner, that it will loosen from the body member after the release of the trap, is very important in this conjunction, because as a result thereof there are no longer any parts projecting and unprotected which may serve as an object into which the trapped animal can bite in its attempts to free itself, or by which the trapped animal can be hurt when moving away with the trap attached to one leg. This arrangement constitutes a very essential advantage, also over the advantage provided by the embodiment shown in FIGS. 1 and 2, in which the release arm 7, which must consist of a relatively hard material, for example steel, to prevent resilience, may, however, be provided with a protective coat of plastics, rubber or like material in order to prevent teeth damage, and also as a protection for the animal against adhering to it by freezing with the tongue or lips at low temperatures.

In FIG. 6 an embodiment is shown which renders it possible that the trap according to FIGS. 3–5 can be put at safety in set position. For this purpose, the catch 19 is provided with a through hole 28, into which a split pin 29 of hairpin type is shown inserted and thereby prevents the release of the tensioned spring. This makes it possible to transport the trap in set state to the place where it is to be laid, and thereby reduces the time of laying the trap and, consequently, also the scent left behind by the trap setter. In this embodiment the release arm portion 27 is also shown provided with a slot 30 for the catch 19. In order not to lose the split pin 29 after its removal, the wire 23, on which the release arm 7 is fastened, may preferably be inserted through an eye 31 at the end of the pin, as shown in FIG. 6. In this embodiment the release arm is straight, whereby the distance between its tread portion 12 and the snare is reduced to a minimum.

The present invention is not restricted to what is described above and shown in the drawings, but can be varied and altered in many different ways within the scope of the claims.

What I claim is:

1. A trap for predatory animals to be laid in animal runways comprising a tubular body member, a protective casing of non-metallic material surrounding the major portion of the body member, a spring in said body member and having one end fastened thereto, a snare, a trap setting mechanism connected between the snare and the other end of the spring, said setting mechanism including a catch adapted for insertion into a hole in the body member for engaging the body member with the spring in an extended set position and maintaining the spring tensioned in said set position, and treadle means on which the animal is to tread attached to said body, said treadle means having a release arm for engaging and releasing said catch from engagement with the body member when an animal treads on said treadle means to thereby release the setting mechanism and cause the snare to move inwardly toward the body member.

2. A trap as in claim 1 wherein said body member is a steel tube and said protective casing is force fit thereover.

3. A trap as in claim 1 further comprising means for pivotally mounting said release arm of said treadle means to said body member, said release arm having a projection which moves inwardly of the hole in the body member to engage the catch and release it when an animal treads on the treadle.

4. A trap as in claim 1 wherein said catch is pivotally mounted to said setting means, said release arm of said treadle means engaging said catch when the spring is in said set position, an animal treading on said treadle means moving said release arm out of engagement with said catch to permit it to pivot out of engagement with the body member and thereby to release the setting mechanism.

5. A trap as in claim 1 further comprising a cap of non-metallic material at at least one end of the body member.

6. A trap as in claim 1 further comprising a safety pin, a second hole in said casing and said body member through which the catch can project, said catch also provided with a hole into which the safety pin can be inserted.

7. A trap for predatory animals to be laid in animal runways comprising a tubular body member, a spring in said body member and having one end fastened thereto, a snare, a trap setting mechanism connected between the snare and the other end of the spring, said setting mechanism including a catch for engaging the body member with the spring in an extended set position and maintaining the spring tensioned in said set position, treadle means on which the animal is to tread, said treadle means including release means for releasing said catch when an animal steps on said treadle means, means for detachably mounting at least a part of said treadle means to said body member whereby said part can become detached from said body member, and further elongated means connecting said detachable part to said body so that said part is dragged with the body.

8. A trap as in claim 7 wherein the entire treadle means is detachable from said body member.

9. A trap as in claim 7 wherein said detachable mounting means comprises a lug on said body member having a hole therein and an arm on said detachable part which fits into said hole of said lug.

10. A trap as in claim 7 wherein said body member is provided with a hole, means pivotally mounting said catch to said setting mechanism with said catch being accessible through said hole, said release means including an arm which engages said catch to hold the catch when the trap is in the set position and to release it when an animal treads on the treadle means.

11. A trap as in claim 10 wherein said detachable mounting means comprises a lug on said body member having a hole therein and an arm on said detachable part which fits into said hole of said lug.

* * * * *